United States Patent [19]

Burns et al.

[11] Patent Number: 5,478,824
[45] Date of Patent: Dec. 26, 1995

[54] ADHERENT CORRECTIVE LENS

[75] Inventors: Dennis L. Burns, Issaquah; Charles A. Bernheiser, Enumclaw, both of Wash.

[73] Assignee: Gargoyles, Inc., Kent, Wash.

[21] Appl. No.: 198,183

[22] Filed: Feb. 17, 1994

[51] Int. Cl.$^6$ .................... G02C 7/06; G02C 7/08
[52] U.S. Cl. .................... 351/172; 351/159; 351/177
[58] Field of Search .................... 351/159, 168, 351/169, 170, 171, 172, 177

[56] References Cited

U.S. PATENT DOCUMENTS

| | | | |
|---|---|---|---|
| D. 270,165 | 8/1983 | Burns | D16/117 |
| 3,195,145 | 7/1965 | Tisher et al. | 351/172 |
| 3,228,696 | 1/1966 | Hull | 273/183 |
| 3,413,057 | 11/1968 | Carmichael | 351/47 |
| 3,628,854 | 12/1971 | Jampolsky | 351/159 |
| 3,685,889 | 8/1972 | Thatcher | 351/47 |
| 3,689,136 | 9/1972 | Atamian | 351/44 |
| 3,890,037 | 6/1975 | Zingarelli | 351/47 |
| 3,904,281 | 9/1975 | Jampolsky | 351/159 |
| 4,018,515 | 4/1977 | Derkas | 351/47 |
| 4,070,103 | 1/1978 | Meeker | 351/52 |
| 4,247,178 | 1/1981 | Cook | 351/47 |
| 4,304,469 | 12/1981 | Solomon | 351/121 |
| 4,357,080 | 11/1982 | Solomon | 351/86 |
| 4,451,127 | 5/1984 | Moffitt, Jr. | 351/47 |
| 4,534,627 | 8/1985 | Vosper | 351/47 |
| 4,547,049 | 10/1985 | Cotie | 351/47 |
| 4,729,650 | 3/1988 | Jennings | 351/47 |
| 4,730,915 | 3/1988 | Jannard | 351/47 |
| 4,740,069 | 4/1988 | Baum | 351/57 |
| 4,741,611 | 5/1988 | Burns | 351/44 |
| 4,824,233 | 4/1989 | Jannard | 351/47 |
| 4,859,048 | 8/1989 | Jannard | 351/159 |
| 4,867,550 | 9/1989 | Jannard | 351/47 |
| 4,938,580 | 7/1990 | Stang | 351/47 |
| 4,943,152 | 7/1990 | Whelen | 351/49 |
| 4,976,530 | 12/1990 | Mackay et al. | 351/44 |
| 5,005,214 | 4/1991 | Koethe | 2/13 |
| 5,007,727 | 4/1991 | Kabaney et al. | 351/47 |
| 5,017,001 | 5/1991 | Kooketsu | 351/86 |
| 5,056,906 | 10/1991 | Akiyoshi | 351/57 |
| 5,106,178 | 4/1992 | Akiyoshi | 351/57 |
| 5,164,749 | 11/1992 | Shelton | 351/47 |
| 5,175,571 | 12/1992 | Tanefsky et al. | 351/158 |
| 5,182,586 | 1/1993 | Bennato | 351/47 |
| 5,349,393 | 9/1994 | Kraft | 351/172 |

OTHER PUBLICATIONS

Elmstrom, G. P.; "Evaluating What'3 s New"; *Journal of the American Optomajol. Assoc.*; vol. 43, No. 7, p. 795, Jul. 1972.
Unilens Corp., USA–Brochure: Low Vision Lens, 1993.

*Primary Examiner*—Scott J. Sugarman
*Attorney, Agent, or Firm*—Patrick Michael Dwyer

[57] ABSTRACT

A corrective lens that is removably adherent to, and substantially in contact with, a pane of a pair of spectacles without the use of a mechanical retention device, and that has at least one curved surface and a refractive index such that the curved surface and the refractive index cooperatively produce a nominal magnifying power. In a preferred embodiment, the corrective lens comprises a flexible plastic capable of conforming to a variety of surface shapes and of adhering via tactile interactions to the pane without the use of an adhesive. Also, a pair of spectacles that comprise a corrective lens securely adhered to a pane of a pair of spectacles without the use of a mechanical retention device. A method of producing a cosmetically appealing pair of spectacles is also disclosed. The method comprises adhering a corrective lens to at least one pane of a pair of spectacles without the use of a mechanical retention device.

9 Claims, 2 Drawing Sheets

ADHERENT CORRECTIVE LENS

TECHNICAL FIELD

The field of the present invention is corrective lenses for spectacles, including eyeglasses and sunglasses.

BACKGROUND OF THE INVENTION

Many people, particularly those in middle age, are farsighted, which means that they have little difficulty seeing objects at a distance, but have considerable difficulty seeing objects up close. These individuals have difficulty seeing print in a book dearly enough to read, so they need some sort of corrective lens or magnifier in order to read. When such an individual is outside in the sun and wearing sunglasses, a practical problem arises if that individual wishes to read a book. For example, he or she must purchase a pair of prescription sunglasses or endure the sun without the benefit of sunglasses. This practical problem is experienced by people needing prescription lenses for other purposes, as well. The purchase of a pair of prescription sunglasses is expensive and involves the further practical problem of carrying around an additional pair of prescription lenses (i.e., the prescription sunglasses).

One attempt to solve the problem of having to purchase and carry two pairs of prescription eyewear at the same time is to wear contact lenses. The contact lenses can be prescription lenses and thus the wearer need carry only a single pair of tinted eyewear for use as sunglasses. Many people have difficulty using contact lenses, however, and many of those who do use contact lenses find them to be irritating at times and to require substantial efforts to insert, remove, and clean.

Another approach has been to use a pair of prescription spectacles that are tinted in such a way that there is a minor tint when the ambient light is relatively low and a more severe tint as the ambient light becomes brighter. This approach is disadvantageous, however, because such spectacles are relatively expensive and the tint of the lenses may change at times when it is not desirable for it to change.

Yet another attempt to solve the problem of the need for two pairs of corrective eyewear is to use "clip-on" or "snap-in" tinted lenses in connection with a pair of clear prescription spectacles. Clip-on lenses are attached to a pair of eyeglasses by a clip, typically located at the center of the clip-on lenses. The clip attaches over the nosepiece of the eyeglasses. Sometimes the clip snaps over the sides of each of a pair of separate lenses formed to the shape of specific eyeglasses for which they are provided. In another variation, a tinted lens is snapped into a circumferential groove inboard of the clear lens. In another attempt to solve the problem, clear prescription lenses are hung, hinged or otherwise detachably mounted inboard of a pair of conventional sunglass lenses. Typically, some additional structure is added to the sunglass frames for holding a prescription lens or pair of lenses behind the sunglass lenses; however in one species, the frames themselves are modified with threads to receive a "screwed-in" prescription lens for each lens of the sunglasses. Clip-on lenses can be disadvantageous, however, because they result in less than desirable optics, typically through an inability to control the spacing and angular relationship between the sunglass lens and its clear lens with any precision or degree of stability, and because they are cosmetically unattractive.

Heretofore, some attempt has even been made, to meet the needs of the military, to combine the qualities of a toric lensed sunglass with prescription lenses, by actually inserting prescription lenses into voids cut out of the sunglass lenses themselves.

Recently, 3M company has provided on die cut sheets small 'half-lens' shaped magnifiers cut from relatively flat vinyl stock and which employ a molded in Fresnel type grating for an optical magnification effect. These 3M lenses also suffer from optical aberrations and poor performance, especially when adhered to the panes of a pair of spectacles. In addition, the magnifying power of the Fresnel material does not adapt well to bending and it is also not readily adaptable to prescription configurations.

There is a need for a simple, inexpensive corrective lens that may be used in connection with a pair of fashion or performance sunglasses to provide a simple magnified or corrective pair of sunglasses that can be used comfortably and effectively for sustained periods of time. Thus, there is a need to adapt non-corrective sunglasses for use as corrective sunglasses without the above noted disadvantages. The present invention provides these and other advantages.

OBJECTS AND SUMMARY OF THE INVENTION

Accordingly, a general object of the present invention is to avoid or substantially alleviate the above-noted problems.

A more specific object of this invention is to provide ready-to-wear sunglasses which can be readily modified to fit the occasional magnified reading needs of some wearers, and the prescription needs of other wearers.

These and other objects of the present invention are described in the following summary of the invention and description of its preferred embodiments.

In one aspect, the present invention is directed to a surface adherent lens for providing optical correction to a pane of a pair of spectacles. The lens is removably adherent to the pane and substantially in contact with a rear surface of the pane. The lens is comprised of at least one curved surface, and made of a material having a refractive index such that the curved surface and the refractive index cooperatively produce a nominal magnifying power. In another aspect, the present invention is directed to a pair of spectacles comprising a corrective lens removably adhered to a pane of said pair of spectacles, said lens substantially in contact with a rear surface of said pane, and said lens comprised of at least one curved surface and comprised of a material having a refractive index such that said curved surface and said refractive index cooperatively produce a nominal magnifying power. In yet another embodiment, the present invention is directed to a method of producing cosmetically appealing eyewear. The method comprises molding a flexible lens to have at least one curved surface, and adhering the lens to at least one pane of a pair of spectacles by deforming the lens to bring it substantially into contact with a rear surface of the pane.

DETAILED DESCRIPTION OF THE INVENTION

The present invention provides devices and methods for the adaptation of panes in spectacles, such as tinted lenses found in sunglasses, to be corrective, and therefore suitable for use by a person having need for optical magnification, such as by a magnifier or magnifying lens, or for optical correction, such as by prescription lenses. In this disclosure, the term "corrective", or "correction", or the like may be used to describe either simple magnification (diopter), or prescription correction (diopter, cylinder, and astigmatism) or both. By means of the invention, such a person may temporarily and removably convert typical sunglasses available on the market to 'generic' magnifying sunglasses or high optical quality prescription sunglasses, depending on the type of inventive lens employed, in a simple and inexpensive manner. Preferred sunglasses for use in the present invention are those eyewear having toric lenses and substantial wrap depth such as those described in U.S. Pat. No. 4,741,611 to Burns and U.S. Design Pat. No. 270,165 to Burns. These sport performance and fashion sunglasses are commercially available under the trademark GARGOYLES. The disclosures of these patents are hereby expressly incorporated herein by reference.

The present invention is particularly useful with respect to these toric sunglasses with substantial wrap depth because it is difficult to make conventional prescription sunglasses having such wrap depth. The invention can also be used with other ready-to-wear sunglasses.

Figure 1:
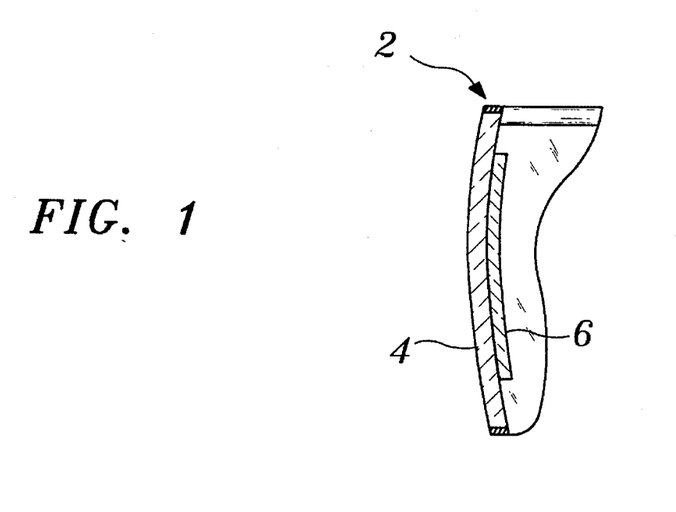
FIG. 1 is a schematic, representational side view of an adherent corrective lens that adheres to the inner surface of a pane of a pair of spectacles.
Figure 2:
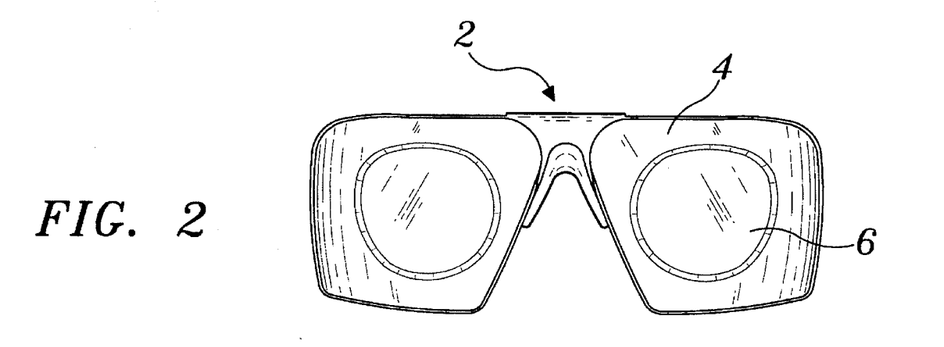
FIG. 2 is a rear view of a pair of spectacles having adherent corrective lenses that adhere to the panes of the pair of spectacles (the ear stems of the spectacles have been removed for clarity).
Figure 3:
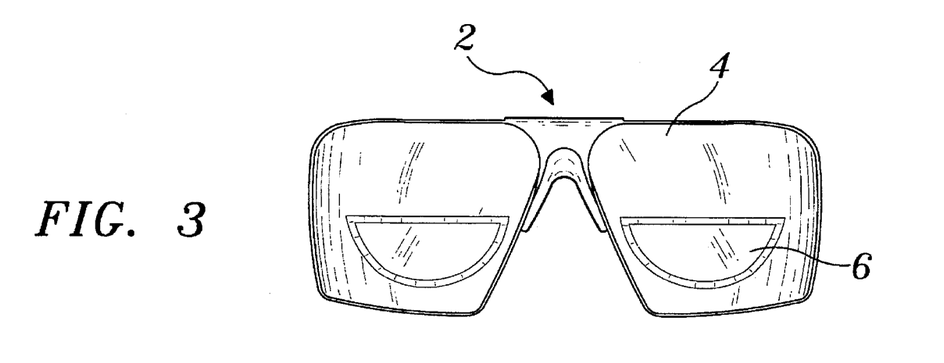
FIG. 3 is a rear view of a pair of spectacles having adherent corrective lenses wherein the periphery of each adherent corrective lens is shaped to provide magnification across only a portion of its respective pane.

Turning to the figures, FIG. 1 depicts a cutaway side view of the inventive adherent corrective lens 6 adhered to a pane 4 of a pair of spectacles 2. FIG. 2 depicts a rear view of the adherent corrective lens 6 adhered to an interior surface of a pane 4 of a pair of spectacles 2. The periphery of the corrective lens may be circular, oval, egg-shaped, aviator-lens shaped, or irregularly shaped. The periphery may likewise be adapted to fit a wide variety of spectacles, or adapted to closely conform to the peripheral edge of a pane of a specified pair of spectacles. For example, FIG. 3 depicts a rear view of an adherent corrective lens 6 having a half-moon shape and specifically adapted for use as a magnifier. As in FIG. 2, the adherent corrective lens 6 is adhered to the interior surface of a pane 4 of a pair of spectacles 2. In the embodiment depicted in FIG. 3, corrective lens 6 may be used similarly to a bifocal lens, and is therefore preferably positioned such that a wearer can easily alternate between viewing through the adherent corrective lens 6 or through the unmodified pane 4.

Thus, in a first aspect, the present invention provides a corrective lens capable of being securely adhered to a pane of a pair of spectacles without the use of a mechanical retention device. By "securely adhered," it is meant that the lens is stably maintained through surface adherence on a surface of the pane under normal usage conditions. Preferably the adherent corrective lens is stably maintained on the pane even under harsh usage conditions, such as sporting and other activities where there could be significant impacts. By "stably maintained," is meant that the adherent corrective lens will not be dislodged from the pane of the spectacles, or otherwise be moved, during normal usage so as to significantly alter the corrective properties of the adherent corrective lens.

The term "corrective lens" is meant to include both magnifiers and prescription corrective lenses. A "magnifier" is a corrective lens that introduces only power. A "prescription corrective lens" may introduce power, cylinder and/or astigmatism. Conventional embodiments of magnifiers and prescription corrective lenses are well known to those skilled in this art.

Magnifiers are preferably used by far-sighted individuals. Since magnifiers introduce only power, they are inexpensively made and do not have to be prescribed by an ophthalmologist. Thus, it is envisioned that those who wish to use such magnifiers for reading at the beach, for example, will be able to purchase such magnifiers at the same place where fashion eyewear may be purchased, and inexpensively and quickly convert a pair of fashion sunglasses to eyewear that can be used for reading, and then later, by simply removing the magnifier of the invention in a preferred embodiment, convert them back to their original state.

One magnifier is typically used in each lens of a two lens pair of spectacles, as disclosed in FIGS. 2 and 3. A magnifier may be typically positioned toward the bottom and center of the lens, as shown in FIG. 3, much the same position as the position of the "reading" portion of a bifocal lens in a traditional pair of prescription spectacles. Magnifiers can also be placed towards the top and outer edge of the lens. Such placement is advantageous for pilots, for example, who need to read overhead instrument panels.

Prescription corrective lenses require that the front and rear of the lens be defined by ophthalmic curves. Because magnifiers introduce only power, it is not necessary for the front of the magnifier lens to be defined by an ophthalmic curve. Accordingly, magnifiers may be made that can be used with any pair of fashion eyewear without significant concern about the shape of the panes of the fashion eyewear (such as toric, cylindrical, spherical, etc.) significantly adversely affecting the magnification properties of the inventive corrective lens.

Figure 4:
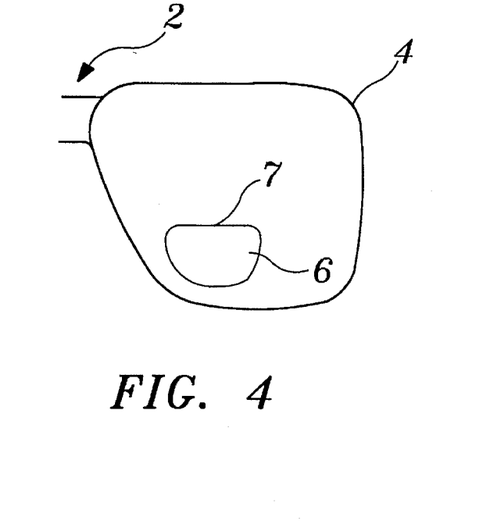
FIG. 4 is an alternate schematic rear view of the adherent lens invention.

In one embodiment, the magnifier lens of the invention is a 25 mm segment generally in the shape shown by lens 6 in FIG. 4. In this embodiment, lens 6 is a plano convex lens having, for achieving various diopter magnification powers, the curves and thicknesses as shown in Table 1 below;

TABLE 1

| Power | C.T. | R1 | R2 |
| --- | --- | --- | --- |
| 2.00 D | 0.035" | 10.435" | plano |
| 2.50 D | 0.035" | 8.351" | plano |
| 3.00 D | 0.036" | 6.962" | plano | where "power" refers to magnification power in diopters, "C.T." refers to thickness at the optical center of the lens, R1 is the radius of the convex curve on the lens, and R2 (which would typically be another curve radius in such a chart) is "plano" meaning no curve, or flat. In this embodiment an edge thickness of 0.032 inches is preferably maintained around the edge of the segment. The dimensions given above are for when the lens is separate from (that is, not adhered to) the pane of the eyewear; dimensions of the lens as adhered to the pane will vary slightly in accordance with bend and flex of the lens segment to accommodate the various curvatures of the panes to which the lens is to adhere. For instance, when this lens is bent to conform to the curvature of the inner surface of a Gargoyle brand lens, there is a small but not very significant amount of power introduced from such bending. In the 2.0 diopter configuration from Table 1, and adhered to a Gargoyle brand lens, there is about-0.07 D introduced in the horizontal meridian, and zero D in the vertical, corresponding to a slight astigmatism (spherical equivalent of 0.03 D) . For the 2.5 D and 3.0 D configurations from Table 1, this astigmatic bending error is 0.024 D and zero respectively in the horizontal meridian, and zero for both in the vertical meridian. In one embodiment of the invention, this magnifier lens is molded from an optical grade vinyl, and these numbers are calculated based on an average refractive index for vinyl taken from the midpoint (n=1.53) of vinyl refractive indices (ranging from 1.50–1.55) listed in the Handbook of Chemistry and Physics. These numbers can vary with the exact vinyl refractive index, or the refractive index of an alternative lens substance.

Figure 5A:
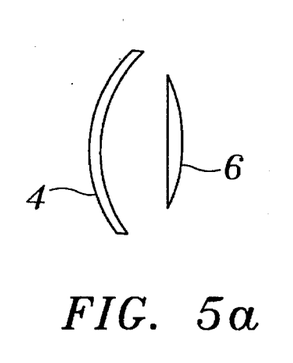
FIGS. 5a and 5b are further schematic side views of the adherent lens invention.
Figure 5B:
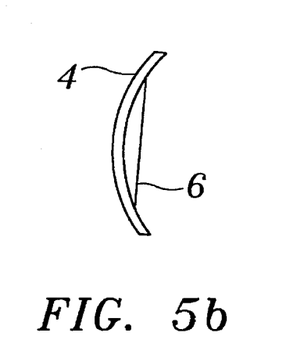

In FIG. 5, typical adherence of plano convex lens 6 to pane 4 is illustrated. In FIG. 5a lens 6 is shown in proximity to pane 4 just prior to adherence. In FIG. 5b lens 6 has been pressed and adhered to pane 4, with the result that the (formerly flat) front surface of lens 6 is now substantially in contact with the rear surface of pane 4, and has conformed itself substantially to the same curvature. At the same time, the (formerly convex) curved rear surface of lens 6 has acquired a recurvature that will typically be flat to slightly concave. It is believed that this configuration and method of adherence results in optimum adherence properties with minimum optical and cosmetic aberrations, while substantially achieving the target magnification power.

Where it is considered that the flex required for the plano convex embodiment described above may be too severe, an optional embodiment is contemplated having a spherical meniscus lens with a front curve lying midway between that of the plano convex magnifier lens and the rear (R2) curves of the spectacle panes to which the lens is to adhere. Additionally, it is contemplated that the upper "straight" line 7 section of lens 6 in FIG. 4 may be modified into a shallow curve convex upward to alleviate any perceived optical or cosmetic deficiency arising from less than exact horizontal line up of the two such lens segments on two panes of a pair of spectacles. It is anticipated that, should a slight horizontal misalignment occur, the relative tilt of the two segments would be relatively easy to see. With the contemplated upward curved modification, any misalignment will be less noticeable, and even have an improved cosmetic appearance.

For a plano convex lens of the type described above, it is not necessary to look through the optical center of the lens, though it is usually desirable for a prescription lens. As long as one looks in a direction parallel to the optical axis, there is no discernable decentration. Therefore it is contemplated that optical placement of the magnifier lenses described above will not be critical, and in fact it is expected that they can be substantially displaced from the direct forward lines of sight. For example, they can be placed as illustrated roughly in FIG. 4, but they could also be placed to the side or near the top of the respective panes. There will be, however, some anticipated aberration introduced depending on the spectacles used. For instance, in the toric curves of the GARGOYLES brand panes, where distances between the optical centers of the panes are less than typical, centrally placed lens segments as illustrated in FIG. 4 will be tilted to the line of sight, and so introduce some slight aberration to the wearer.

Alternatively, the segment described above can be molded to have a forward (R1) surface that exactly, or at least substantially, matches the curves of the rear pane surfaces (R2) of the spectacles to which the lens is to adhere. This will be particularly advantageous when a prescription lens is desired for adhering in the manner of the invention to a pane or panes of a pair of spectacles. Tables 3, 4, and 5 below contain typical data and example calculations for determining the rear (R2) curvature (magnifier diopter only, not exact prescription calculations, the method of which will be known to those skilled in the art) in both horizontal and vertical meridians, given an R1 front curvature that matches an R2 rear curvature of a pane. Dimensions given in the Tables below are in inches unless otherwise noted. In the examples below the curvatures are given for the rear (R2) curvatures of a GARGOYLES brand toric lens pane, and like the magnifier curve calculations in Table 1, are constrained to produce a uniform edge thickness. In this manner, prescription adherent lenses may be prescribed by opthamological professionals, and then molded or ground from substances disclosed herein and then preferably removably adhered to the panes of the indicated spectacles in the manner disclosed herein.

TABLE 2

Definition of Variables:

| | |
|---|---|
| Fv | Target power at optical center of lens |
| Fv(R1,R2,t,n) | Power computed for specified values of R1, R2, t and n |
| R1 | Radius of curvature of first surface |
| R2 | Radius of curvature of second surface |
| t | Thickness at optical center |
| n | Index of refraction |
| R2(Fv,R1,t,n) | Radius of second surface required to produce target power |
| d | Distance from center (×2) for edge thickness calculation |
| S1 | Sagittal distance of first surface |
| S2 | Sagittal distance of second surface |
| t(e) | Edge thickness measured parallel to optical axis |
| t(c) | Caliper edge thickness. Approximation taken perpendicular to the first surface |

Figure 6A:
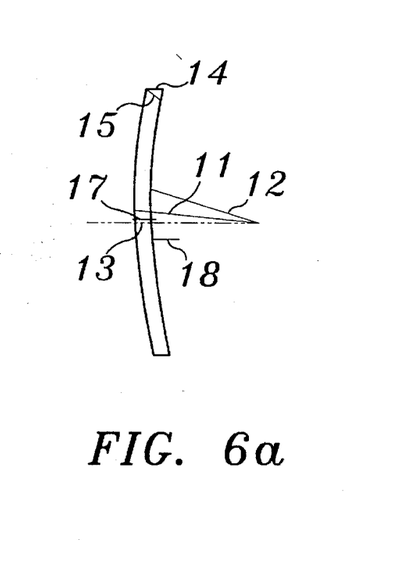
FIG. 6a is a schematic side view of typical lens geometry in the invention.
Figure 6B:
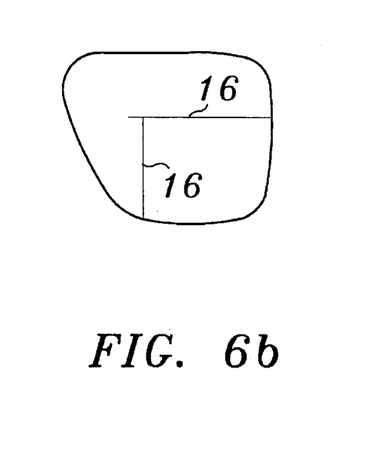
FIG. 6b is a schematic rear view of typical lens geometry in the invention.

In tables 3, 4, and 5 below the variable values noted in the left columns of each calculation section have the meanings as indicated in Table 2 above. These values are graphically (typically) illustrated in FIG. 6, where R1 radius of curvature of forward surface is 11; R2 radius of curvature of rear surface is 12; t thickness at optical center is 13; d distance from optical center (X2) is 16; S1 sagittal distance of forward surface is 17; S2 sagittal distance of rear surface is 18; t(e) edge thickness measured parallel to optical axis is 14; and t(c) caliper edge thickness is 15.

TABLE 3

| Seg power 2.0 D (R2 plano) | Seg power 2.0 D (R2cyl horiz. merid.) | Seg power 2.0 D (R2cyl vert. merid.) |
|---|---|---|

|  | input | calc. | input | calc. | input | calc. |
|---|---|---|---|---|---|---|
| Fv | 2.000 D |  | 2.000 |  | 2.000 |  |
| Fv(R1,R2,t,n) |  | 2.000 D |  | 1.930 D |  | 2.000 D |
| R1 | 10.435 |  | 2.022 |  | 4.491 |  |
| R2 | 10000.000 |  | 2.469 |  | 7.848 |  |
| t (mm) | 0.88 mm |  | 0.88 mm |  | 0.88 mm |  |
| n | 1.530 |  | 1.530 |  | 1.530 |  |
| R2(Fv,R1,t,n) |  | 10818.740 |  | 2.490 |  | 7.848 |
| d | 0.490 |  | 0.490 |  | 0.490 |  |
| S1 |  | 0.003 |  | 0.015 |  | 0.007 |
| S2 |  | 0.000 |  | 0.012 |  | 0.004 |
| t(e) (mm) |  | 0.81 mm |  | 0.81 mm |  | 0.81 mm |
| t(c) (mm) |  | 0.81 mm |  | 0.81 mm |  | 0.81 mm |

TABLE 4

|  | Seg power 2.5 D (R2 plano) | | Seg power 2.5 D (R2cyl horiz. merid.) | | Seg power 2.5 D (R2cyl vert. merid.) | |
|---|---|---|---|---|---|---|
|  | input | calc. | input | calc. | input | calc. |
| Fv | 2.500 D |  | 2.500 |  | 2.600 |  |
| Fv(R1,R2,t,n) |  | 2.500 |  | 2.476 D |  | 2.000 D |
| R1 | 8.351 |  | 2.022 |  | 4.491 |  |
| R2 | 10000.000 |  | 2.639 |  | 7.848 |  |
| t (mm) | 0.90 mm |  | 0.90 mm |  | 0.88 mm |  |
| n | 1.530 |  | 1.530 |  | 1.530 |  |
| R2(Fv,R1,t,n) |  | 9022.178 |  | 2.647 |  | 9.666 |
| d | 0.490 |  | 0.490 |  | 0.490 |  |
| S1 |  | 0.004 |  | 0.015 |  | 0.007 |
| S2 |  | 0.000 |  | 0.011 |  | 0.004 |
| t(e) (mm) |  | 0.81 |  | 0.81 mm |  | 0.81 mm |
| t(c) (mm) |  | 0.81 |  | 0.81 mm |  | 0.81 mm |

TABLE 5

|  | Seg power 3.0 D (R2 plano) | | Seg power 3.0 D (R2cyl horiz. merid.) | | Seg power 3.0 D (R2cyl vert. merid.) | |
|---|---|---|---|---|---|---|
|  | input | calc. | input | calc. | input | calc. |
| Fv | 3.000 D |  | 3.000 |  | 3.000 |  |
| Fv(R1,R2,t,n) |  | 3.000 |  | 3.000 D |  | 3.000 D |
| R1 | 6.962 |  | 2.022 |  | 4.491 |  |
| R2 | 10000.000 |  | 2.826 |  | 12.576 |  |
| t (mm) | 0.92 mm |  | 0.92 mm |  | 0.92 mm |  |
| n | 1.530 |  | 1.530 |  | 1.530 |  |
| R2(Fv,R1,t,n) |  | 8173.697 |  | 2.826 |  | 12.576 |
| d | 0.490 |  | 0.490 |  | 0.490 |  |
| S1 |  | 0.004 |  | 0.015 |  | 0.007 |
| S2 |  | 0.000 |  | 0.011 |  | 0.002 |
| t(e) (mm) |  | 0.81 |  | 0.81 mm |  | 0.81 mm |
| t(c) (mm) |  | 0.81 |  | 0.81 mm |  | 0.81 mm |

In some embodiments, the adherent corrective lens may be held fast to the pane of the spectacles by, for example, gluing, suction, or fusing. Such adherence can be effected by use of an adhesive, preferably a clear adhesive, or by tactile interactions that arise from contact of the corrective lens with the surface of the pane without the use of an adhesive. Such tactile interactions are known to include electrostatic forces between the glass or plastic of the pane of the pair of spectacles and the plastic material of the corrective lens, and also vacuum forces between the adherent corrective lens and the pane of the spectacles.

In a preferred embodiment, the adherent corrective lens is made from optical grade, elastomeric material, such as a flexible plastic. Preferred corrective lenses are made of plastic and are flexible, and the adherent corrective lens is capable of conforming to a variety of shapes of lenses, including cylindrical, conical, spherical, irregular, and toroidal, or a combination of such surfaces.

The adherent corrective lens may adhere to the surface of the pane of a pair of spectacles by tactile interactions between the corrective lens and the pane, such as by electrostatic and/or vacuum forces, or by other means other than the use of a permanent adhesive, so that the corrective lens may be removably adhered, removed and reused. In particular, such a corrective lens may be used in connection with a pair of sunglasses by carefully applying the corrective lens to the sunglasses. The preferred corrective lens is held in place by the tactile interactions inherently created between the corrective lens and the pane of the spectacles. When the wearer desires to wear a second pair of non-prescription sunglasses, the corrective lens may be removed from the original pane, typically by peeling the corrective lens from the pane, and then applied to a second pane.

Accordingly, it is preferred that the plastic used to produce the adherent corrective lens be strong and durable, and thus useful for numerous applications and removals from a series of panes for spectacles. The corrective lens may be made of any optical grade clear plastic material such as optically clear urethane, optically clear vinyl, optical grade morthanes (TPU's), or other optically clear thermoplastic synthetic rubber compounds such as KRATON. One particularly preferred thermoplastic synthetic rubber compound is commercially available from the GLS Company under the trademark DYNAFLEX. Another plastic contemplated for use is a Morthane brand aliphatic thermoplastic polyurethane from Morton International, selected from the group of Morton numbers PE 192, PE 193, and PE199. It is preferred that the corrective lens be "water clear," but a small amount of tint may be tolerated.

The adherent corrective lens may be produced by injection molding, although other molding methods may also be used, as will be appreciated by those skilled in the art. Other methods, including grinding, that are well known to those skilled in this art, may also be used to produce these lenses.

In alternate preferred embodiment, the corrective lenses may be elastomeric and/or flexible as described above, or may alternatively be molded or ground from a more sold optical material, such as conventional eyeglass lens material as will be known to those skilled in the art, and further comprise an adhesive that is layered on all or a portion of a surface of the corrective lens that is to be applied to, and adhered to, the pane of the pair of spectacles. Such adhesives are preferably as optically clear as possible so that there is minimal interference with the optics of the eyewear. Adhesives suitable for use with the present invention are well known to those skilled in the art, and may be selected from known pressure sensitive adhesives, dissolvable adhesives, and for permanent sunglass conversions, permanent adhesives.

Although the corrective lens will typically be applied to the interior surface of the pane of the spectacles, as exemplified in FIG. 1, the corrective lens may also be designed so as to be applied to the exterior surface of the pane of the pair of spectacles.

In a further aspect, as depicted in FIG. 2, the present invention provides a pair of spectacles comprising a corrective lens as described above securely adhered to a pane of the pair of spectacles without the use of any mechanical retention device. Typically, two corrective lens, whether for magnification or prescriptive correction, will be used with one lens on each of the two panes of a pair of sunglasses. However, a single corrective lens may also be adhered to a single pane eyeglass, or two corrective lenses may be used in combination, and applied to a single pane sunglass.

In another aspect, the present invention provides a method of producing a cosmetically appealing pair of spectacles, preferably sunglasses. The method comprises adhering a corrective lens as described above to a pane already located within the pair of spectacles without the use of a mechanical retention device. In one embodiment, the corrective lens is adhered via the use of an adhesive. In a preferred embodiment, the corrective lens is adhered by tactile interactions, such as electrostatic forces and/or vacuum forces between the corrective lens and the pane of the spectacles.

In yet another aspect, the inventive method further comprises, subsequent to adhering the corrective lens to the pane of the pair of spectacles, removing the corrective lens from the pane of the spectacles, typically by peeling the corrective lens off the pane, followed by applying, and adhering, the corrective lens to a second pair of spectacles. These further steps may be repeated as desired.

A preferred embodiment of the present invention includes the use of a magnifier made of DYNAFLEX, a thermoplastic synthetic rubber that is able to adhere to a pair of GARGOYLES fashion sunglasses by tactile interactions.

The present embodiments of the present invention are to be considered in all respects as illustrative, but not restrictive. The scope of the invention is indicated by the appended claims rather than by the foregoing description, and all changes that come within the range and equivalency of the claims are therefore intended to be embraced therein.

I claim:

1. A pair of spectacles comprising a corrective lens removably adhered to a substantially curved pane of the pair of spectacles, the corrective lens having a nominal magnifying power and comprised of clear elastomeric material, the corrective lens removably adherent to a pane of a rear surface of a pair of spectacles, the corrective lens having, before it is adhered to the pane, a non-Fresnel convex surface and a non-Fresnel non-concave surface, and comprising a corrective lens material having a refractive index such that the nominal magnifying power of the corrective lens is produced solely by cooperation of the refractive index with the corrective lens surfaces, and the lens material having a flexibility such that the corrective lens is conformable to a variety of shapes of the rear surface of the pane; wherein the corrective lens is removably adherent to the pane through inherent tactile interactions and substantial contact between a surface of the corrective lens and the rear surface of the pane when the corrective lens is pressed against the pane.

2. The spectacles of claim 1 wherein the corrective lens is a prescription lens.

3. A method of producing a cosmetically appealing pair of optically magnified, substantially curved lens spectacles comprising the steps of:

(1) molding a flexible corrective lens to have a nominal magnifying power and a non-Fresnel convex surface and a non-Fresnel non-concave surface, wherein the corrective lens is comprised of material having a refractive index such that the nominal magnifying power of the corrective lens is produced solely by cooperation of the refractive index with the corrective lens surfaces;

(2) removably adhering the corrective lens to a substantially curved pane of the pair of spectacles by pressing the corrective lens to deform the corrective lens and thereby bring the corrective lens substantially into contact with a rear surface of the pane to adhere the corrective lens to the pane through inherent tactile interactions.

4. The method of claim 3, further comprising removing the corrective lens from the pane of the spectacles and then applying the corrective lens to a pane of a second pair of spectacles.

5. A corrective lens having a nominal magnifying power and comprised of clear elastomeric material, the corrective lens removably adherent to a substantially curved rear surface of a pane of a pair of spectacles, the corrective lens having, before it is adhered to the pane, a non-Fresnel convex surface and a non-Fresnel non-concave surface, and comprising a lens material having a refractive index such that the nominal magnifying power of the corrective lens is produced solely by cooperation of the refractive index with the corrective lens surfaces, and the corrective lens material having a flexibility such that the corrective lens is conformable to a variety of shapes of the rear surface of the pane; wherein the corrective lens is removably adherent to the pane through inherent tactile interactions and substantial contact between a surface of the corrective lens and the rear surface of the pane when the corrective lens is pressed against the pane.

6. The lens of claim 5 where said lens has a front curved surface and a rear curved surface, and said surfaces are molded to produce a prescription optical correction.

7. The lens of claim 6 wherein said lens is made of a flexible plastic having a front curved surface substantially corresponding to a rear surface shape of said pane of said pair of spectacles.

8. The lens of claim 5, wherein a front surface of the lens is flat, the flat surface being deformed to the shape of the rear surface of the pane as the lens is brought substantially into contact with the rear surface.

9. The lens of claim 5 wherein the difference between a nominal magnifying power of the lens after it is adhered to the pane, and the nominal magnifying power of the lens before it is adhered to the pane, is not significant.

* * * * *

UNITED STATES PATENT AND TRADEMARK OFFICE
CERTIFICATE OF CORRECTION

PATENT NO. : 5,478,824

DATED : December 26, 1995

INVENTOR(S) : Dennis L. Burns

It is certified that error appears in the above-indentified patent and that said Letters Patent is hereby corrected as shown below:

Column 1, line 15, change "dearly" to --clearly--.
Column 5, line 9, change "about-0.07" to --about -0.07--.
Column 9, line 23, change "sold" to --solid--.

Signed and Sealed this

Seventh Day of May, 1996

Attest:

BRUCE LEHMAN

Attesting Officer

Commissioner of Patents and Trademarks

Adverse Decisions In Interference

Patent No. 5,478,824, Dennis L. Burns, Charles A. Bernheiser, ADHERENT CORRECTIVE LENS, Interference No. 103,919, final judgment adverse to the patentees rendered May 8, 1998, as to claims 1-9.

*(Official Gazette July 7, 1998)*